United States Patent
Morr et al.

(12)
(10) Patent No.: US 6,857,780 B2
(45) Date of Patent: Feb. 22, 2005

(54) RODLESS SLIDE ASSEMBLY

(75) Inventors: Glen A. Morr, Churubusco, IN (US); Larry E. Keeling, Jr., Fort Wayne, IN (US); Scott A. Shepherd, Hoagland, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 10/706,155

(22) Filed: Nov. 12, 2003

(65) Prior Publication Data

US 2004/0131289 A1 Jul. 8, 2004

Related U.S. Application Data

(60) Provisional application No. 60/426,521, filed on Nov. 15, 2002.

(51) Int. Cl.[7] .............................................. F16C 29/08
(52) U.S. Cl. ........................................ 384/15; 384/45
(58) Field of Search ................................ 92/88, 165 R; 384/43–45, 15

(56) References Cited

U.S. PATENT DOCUMENTS

| | | |
|---|---|---|
| 4,373,427 A | 2/1983 | Garlapaty et al. |
| 4,545,290 A | 10/1985 | Lieberman |
| 4,685,383 A | 8/1987 | Ruchser |
| 4,724,744 A | 2/1988 | Rosengren |
| 4,829,881 A | 5/1989 | Taki et al. |
| 4,852,465 A | 8/1989 | Rosengren |
| 4,856,415 A | 8/1989 | Noda |
| 4,991,494 A | 2/1991 | Migliori |
| RE34,049 E | 9/1992 | Taki et al. |
| 5,246,237 A | 9/1993 | Göttling et al. |
| 5,275,088 A | 1/1994 | Takada et al. |
| 5,279,207 A | 1/1994 | Takada et al. |
| 5,311,810 A | 5/1994 | Takada et al. |
| 5,333,535 A | 8/1994 | Miyamoto et al. |
| 5,483,868 A | 1/1996 | Green |
| 5,517,901 A | 5/1996 | Lipinski |
| 5,555,789 A | 9/1996 | Rosengren et al. |
| 5,868,499 A * | 2/1999 | Greubel et al. ................ 384/15 |
| 5,996,469 A | 12/1999 | Green |
| 6,257,123 B1 | 7/2001 | Morr et al. |
| 6,321,636 B1 | 11/2001 | Fritz et al. |
| 6,338,294 B1 | 1/2002 | Wagner et al. |
| 6,425,315 B1 | 7/2002 | Kancko et al. |

OTHER PUBLICATIONS

United Components, PM Pneumatic Version 1 Technical Data and Detail webpage; www.united–components.com/en/ . . . , 2 pages, Mar. 10, 2004.

United Components, PM Pneumatic Version 2 Technical Data and Detail webpage; www.united–components.com/en/ . . . , 3 pages, Mar. 10, 2004.

* cited by examiner

Primary Examiner—Thomas R. Hannon
(74) Attorney, Agent, or Firm—Barnes & Thornburg LLP

(57) ABSTRACT

A rodless slide assembly is provided having first and second longitudinally extending chambers. A piston assembly is disposed in the first longitudinally extending chamber and is movable relative thereto. A slide assembly is disposed in the second longitudinally extending chamber and also movable relative thereto.

29 Claims, 19 Drawing Sheets

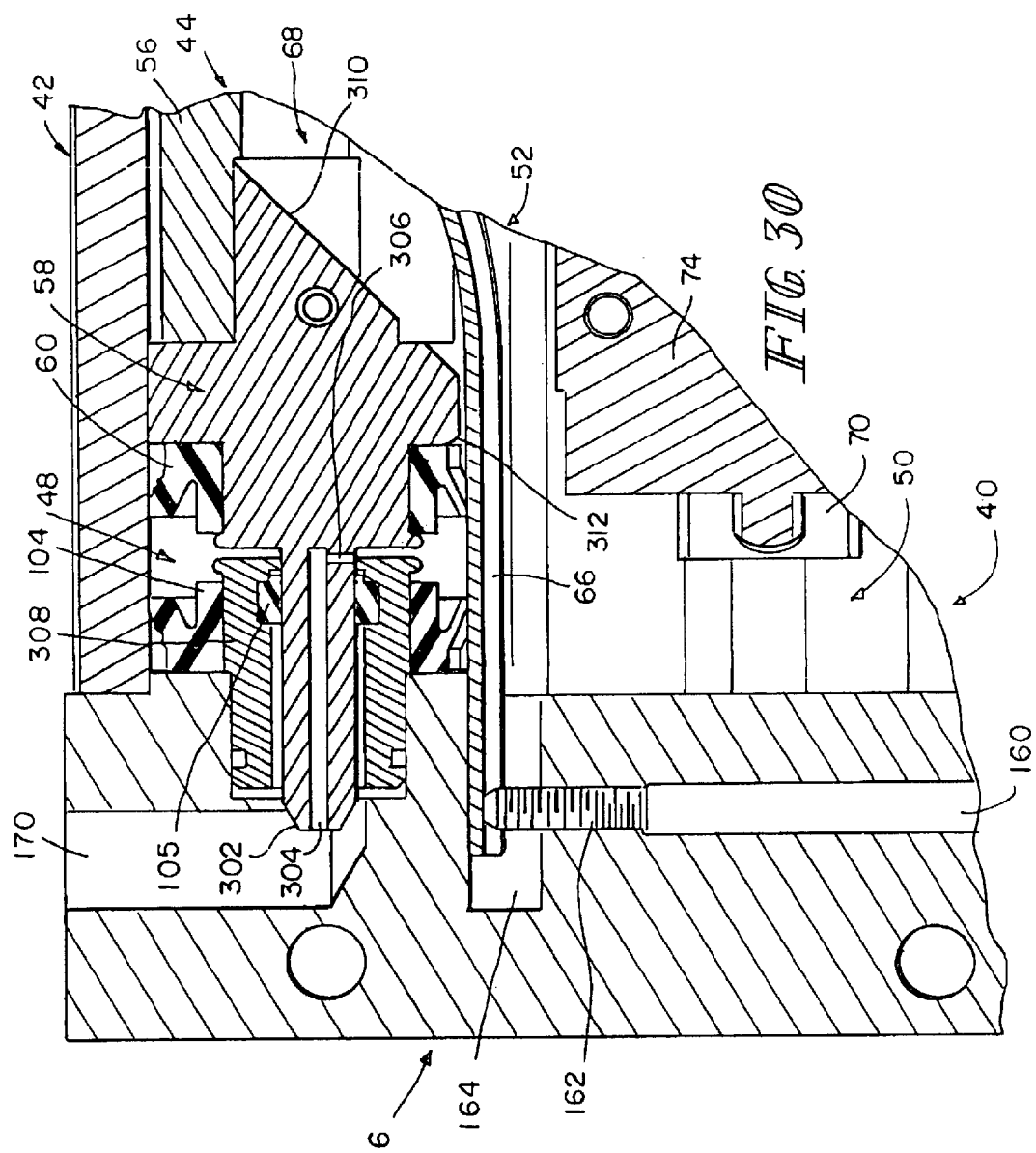

RODLESS SLIDE ASSEMBLY

RELATED APPLICATIONS

The present application is related to and claims priority to U.S. Provisional Patent Application, Ser. No. 60/426,521, filed on Nov. 15, 2002, entitled Dual Chamber Rodless Slide. The subject matter disclosed in that provisional application is hereby expressly incorporated into the present application.

TECHNICAL FIELD

The present disclosure relates to slide mechanisms, and more particularly, to rodless slide assemblies and improvements thereto.

BACKGROUND AND SUMMARY

Typical rodless slide assemblies include an elongated chamber having a movable saddle disposed thereon. A piston assembly is located within the chamber and is moveable reciprocally under fluid pressure within the chamber. The slide assembly is "rodless" because there is no piston rod attached to the piston assembly. Conventional rodless slide assemblies include a portion of the piston assembly extending through a slot disposed in the chamber. This portion of the piston assembly is coupled externally to the saddle which moves with the piston assembly. It is upon this saddle that a tool or a work piece can be mounted or secured for use in manufacturing facilities or workstations, for example.

The piston assembly is sealed from the saddle by means of a sealing strip or band located over the periphery of the slot. Conventionally, the portion of the piston assembly that extends through the slot does so between the periphery of the slot and the sealing strip. When the piston assembly moves, a portion of the sealing strip is separated from the periphery of the slot. After the piston passes, the strip or band is resiliently repositioned over the slot to seal the same from the exterior.

It would be beneficial to provide a rodless slide assembly as an alternative configuration to perform the above-described and other functions of rodless slide assemblies.

Accordingly, an illustrative embodiment of a rodless slide assembly is provided herein comprising first and second longitudinally extending chambers. The second longitudinally extending chamber is located adjacent the first longitudinally extending chamber and is in communication therewith. A piston assembly is disposed in the first longitudinally extending chamber and is movable relative thereto. A slide assembly is disposed in the second longitudinally extending chamber and is movable relative thereto. The piston assembly is coupled to the slide assembly.

In the above and other illustrative embodiments, the rodless slide assembly may also comprise: a longitudinally extending slot located between first and second longitudinally extending chambers; a slot providing communication between chambers; a linear seal being positioned between first and second longitudinally extending chambers; a piston seal being located in a first longitudinally extending chamber; a piston seal having a cavity that is complimentarily shaped and engages a portion of a linear seal; a first longitudinally extending chamber receiving first and second piston seals with a piston assembly located therebetween; a second longitudinally extending chamber having a longitudinally extending channel disposed therein; a slide assembly comprising a bearing member extending therefrom; a bearing member being located in a longitudinally extending channel and being configured for movement therein; the bearing member being a bearing rail; a grommet being attachable to a piston assembly and coupling to a slide assembly so that actuation of a piston assembly causes the slide assembly to move; a longitudinally extending opening being disposed through a second longitudinally extending chamber; a longitudinally extending cover being positioned over the opening; a portion of a slide assembly extending from an opening, and receiving a portion of the cover and attaching to an outer cap; a slide assembly comprising a bearing member extending therefrom and engaging the inner surface of a second longitudinally extending chamber; a slide assembly comprising a plurality of bearings, each configured to engage the inner surface of a second longitudinally extending chamber; a slide assembly comprising a body that is selectively expandable and contractible to adjust tolerance between a plurality of bearings and the inner surface of a second longitudinally extending chamber; and expandability of a slide assembly being accomplished by at least one slot and one fastener wherein the fastener can either separate or contract the slot to either selectively expand or contract the slide assembly.

Another illustrative embodiment provides a rodless slide assembly comprising a piston assembly, a longitudinally extending chamber and a slide assembly. The slide assembly is located and moveable within the longitudinally extending chamber. The piston assembly is in communication with the slide assembly and is located exterior of the longitudinally extending chamber.

In the above and other illustrative embodiments, the rodless slide assembly may also comprise: a piston assembly being located in another longitudinally extending chamber; a slide assembly being connected to a saddle located exterior of the longitudinally extending chamber; a piston assembly being spaced apart from a slide assembly; a slide assembly being movable in a plane that is located substantially parallel to a piston assembly; a slide assembly being connected to a saddle located exterior of the longitudinally extending chamber; a longitudinally extending chamber being located in a housing and being positioned substantially parallel to another longitudinally extending chamber that receives a piston assembly; and a housing having a slot disposed therein which provides communication between piston and slide assemblies.

Another illustrative embodiment provides a rodless slide assembly comprising a piston and a slide. Both the piston and slide are located within a housing. The piston is actuated for reciprocal movement and the slide is attached to the piston for concurrent movement therewith. In addition, the slide and piston are located in separate chambers.

In the above and other illustrative embodiments, the rodless slide assembly may also comprise: the chambers being located substantially parallel to each other; and a saddle being attached to a slide and located exterior of a housing.

Another illustrative embodiment provides a rodless slide assembly comprising first and second longitudinally extending chambers, a piston assembly, a slide assembly, an arm, a carriage and a saddle. The second longitudinally extending chamber is located adjacent the first longitudinally extending chamber. The chambers have a slot located therebetween. The piston assembly is located in the first longitudinally extending chamber and is moveable relative thereto. The slide assembly is located in the second longitudinally extending chamber and is movable relative thereto. The arm is located in the slot and is attached to the piston assembly and to the slide assembly. The second longitudinally extending chamber includes a longitudinally extending opening. The carriage extends from the longitudinally extending opening. The saddle is attached to the carriage and is located exterior of the second longitudinally extending chamber.

Another illustrative embodiment provides a rodless slide assembly comprising first and second longitudinally extending chambers. The first chamber comprises a powered actuation means, and the second chamber comprises a slide means. The slide means engages the actuation means as well as an attachment means located exterior of the rodless slide assembly.

Additional features and advantages of the rodless slide assembly will become apparent to those skilled in the art upon consideration of the following detailed description of the illustrated embodiment exemplifying the best mode of carrying out the dual chamber rodless slide assembly as presently perceived.

BRIEF DESCRIPTION OF DRAWINGS

The present disclosure will be described hereafter with reference to the attached drawings which are given as non-limiting examples only, in which:

FIG. 30 is a top cross-sectional view of a portion of the dual chamber rodless slide assembly.

DETAILED DESCRIPTION OF THE DRAWINGS

Figure 1:
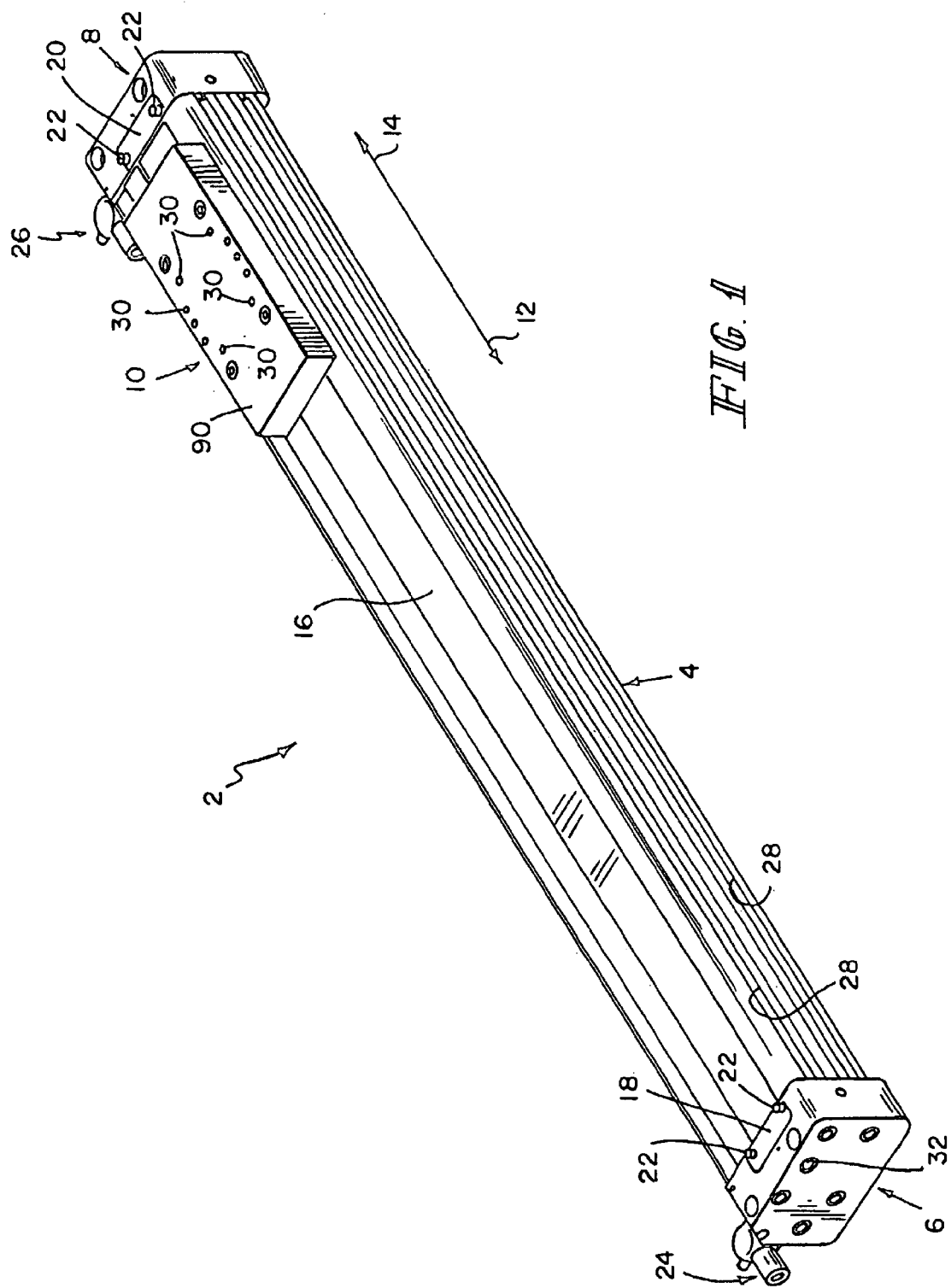
FIG. 1 is a perspective view of a dual chamber rodless slide assembly.

A perspective view of a dual chamber rodless slide assembly 2 is shown in FIG. 1. Assembly 2 comprises a longitudinally extending body 4 bounded by cap blocks 6 and 8. A saddle assembly 10 is located on the top exterior of slide assembly 2 and is movable along the length of same in directions 12 and 14. The saddle assembly 10 slides or moves along the exterior of slide assembly 2 adjacent band 16 which is illustratively fastened to end caps 6 and 8 via clamps 18 and 20 using fasteners 22. Fluid controls 24 and 26 are illustratively located at caps 6 and 8, respectively, to provide fluid into fluid ports 170 and 172 in the interior of rodless slide assembly 2. (See, also, FIG. 7.) The fluid supplies the power that ultimately drives the saddle assembly 10 in directions 12 and 14, depending on the alternating supply of that fluid into controls 24 and 26. In this illustrative embodiment, attachment channels 28 are disposed longitudinally within body 4 for attaching to components of a workstation or assembly line. Saddle assembly 10 also comprises mount bores 30 to allow the saddle assembly 10 to attach to any variety of accessories. An access port 32 is shown disposed within cap 6. The access port 32 illustratively receives shock absorbing members or locating pins to limit the travel of slide assembly 46 or carriage 76. (See, also, FIGS. 8 and 12.) It is appreciated that a similar access port is provided in cap 8 for similar purposes.

Figure 2:
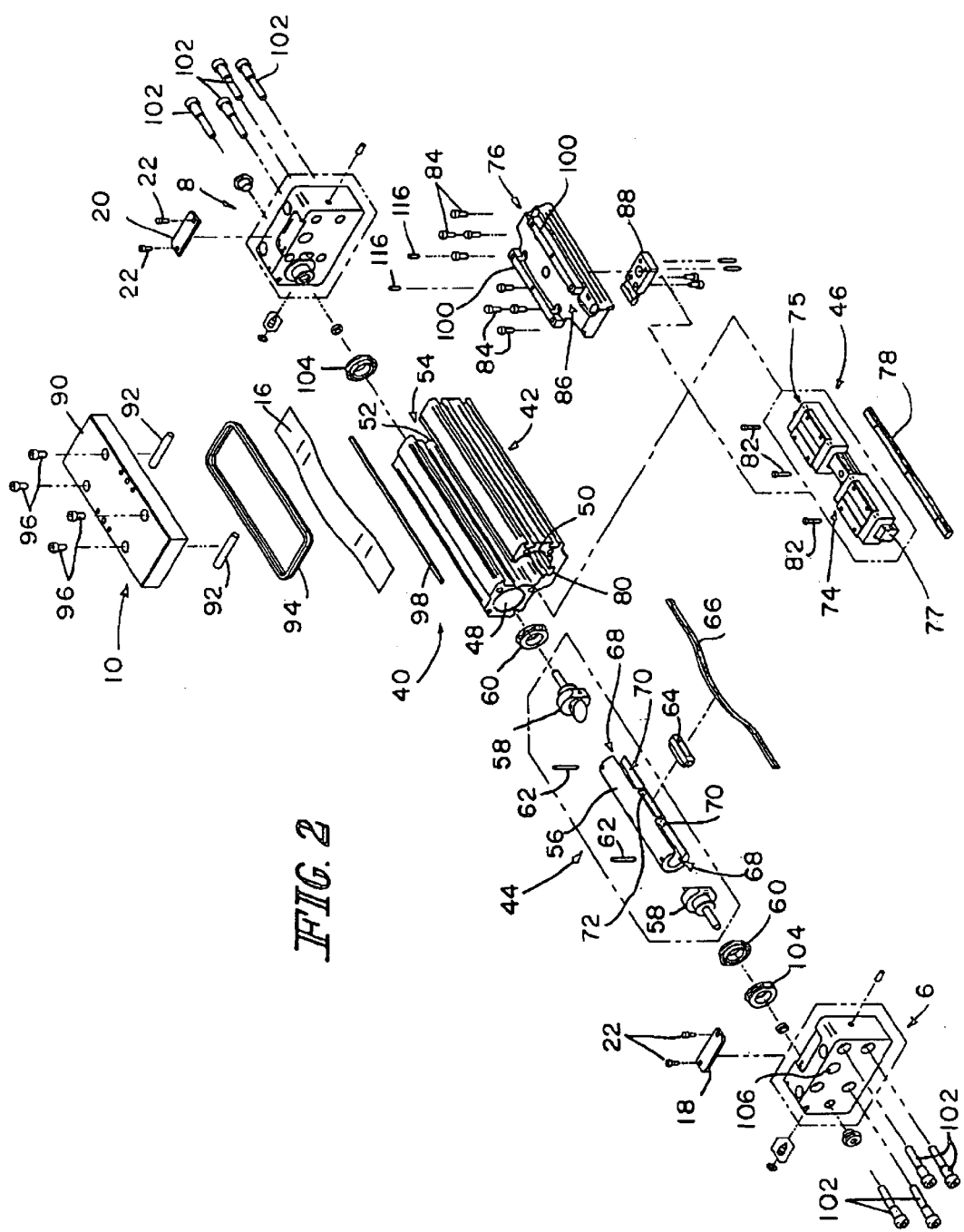
FIG. 2 is an exploded view of one illustrative embodiment of a dual chamber rodless slide assembly.

An exploded view of one illustrative embodiment of a dual chamber rodless slide assembly 40 is shown in FIG. 2. Assembly 40 comprises a body 42, a piston assembly 44, a slide assembly 46, and saddle assembly 10. The body 42 comprises a piston cylinder or chamber 48 and a slide cylinder or chamber 50, both extending longitudinally therethrough. Illustratively, a slot 52 is located between piston chamber 48 and slide chamber 50, providing communication therebetween. Additionally, slide chamber 50 includes a longitudinally extending opening 54, allowing communication between slide chamber 50 and the exterior of body 42. In this illustrative embodiment, piston chamber 48 is configured to receive piston assembly 44. Piston assembly 44 comprises a piston 56 having a cross-section which generally conforms to the cross-section of piston chamber 48. Bounding the ends of piston 56 are piston caps 58. Piston caps 58 are configured to provide the ends of piston 56 and receive piston seals 60. (See, also, FIG. 7.) Other sealing caps or members can be disposed in caps 6 or 8 to appropriately seal assembly 40. Fasteners 62 are disposed through both piston 56 and piston caps 58 to secure same to the piston 56. Piston assembly 44 further comprises a grommet 64 which attaches thereto. A linear seal 66 is at least partially extended into a bore 68 of piston 56 and extends from slot portions 70. Illustratively, piston 56 can be made from a milled material, such as aluminum, with bores 68 and slot portions 70 milled therein.

It is appreciated that body 42 may be made from either one or a plurality of extruded aluminum sections and may be anodized to protect its surface. The extrusion may incorporate the bore of the cylinder or chamber, the geometry for mounting the slide block rail, and the grooves in the slide chamber for the bearing members. Again, it is appreciated that body 42 may be composed of one or more components. For example, separate extrusions can be made for the piston chamber 48 and the slide chamber 50, with the two attached to form a complete body.

Grommet 64 is illustratively fitted into a pocket 72 formed in piston 56, illustratively, between slot portions 70. It is appreciated that grommet 64 provides support and guidance for linear seal 66, as well as allowing piston assembly 44 to float in alignment with slide assembly 46. (See, also, FIGS. 7 and 17 through 20.) It is appreciated that grommet 64 may be made of a polyurethane or other shock absorbing or semi-rigid material that can absorb any impact forces created on either the piston or slide assemblies at the end of a stroke. Grommet 64 may also be configured to accommodate misalignment or tolerances between the piston or slide assemblies.

It is appreciated that piston 56 can be made from aluminum tubing, for example, with piston caps 58 pinned thereto with fasteners 62. It is further appreciated that piston assembly 44, or even piston 56 itself, can be machined to accept any array of optional switches, switch magnets, or sensors. It is also contemplated that piston caps 58 can be machined with radius and angles to guide linear seal 66 during assembly and automatic cycling.

Piston seals 60 may illustratively be made from a polyurethane or other plastic or rubber-like material. The edges of seals 60 may be rounded to keep the seal from removing any grease lubrication located on the periphery of piston chamber 48. (See, also, FIG. 25.) It is further appreciated that the edges of seal 60 may be ribbed to carry additional grease to needed areas along the travel of piston assembly 44.

A slide assembly 46 is configured to be received within slide chamber 50. In this illustrative embodiment, slide assembly 46 comprises slide blocks 74, 75, and a carriage 76. In this illustrative embodiment, slide block rail 77 is attached to the underside of slide blocks 74 and 75. A longitudinally extending nut 78 is configured to be fitted within rail slot 80. (See, also, FIG. 3.) Nut 78 is attached to slide block rail 77.

Nut 78 is configured to attach rail 77 in chamber 50. It is appreciated that nut 78 can alternatively be a plurality of nuts located in slot 80. It is further appreciated that rail 77 can be attached to chamber 50 in any variety of ways as an alternative to nut 78 and fasteners 82. In this illustrative embodiment, carriage 76 is located on top of blocks 74, 75, opposite rail 77. Fasteners 84 illustratively attach carriage 76 to blocks 74, 75. It is appreciated, however, that rail 77 can be located anywhere in chamber 50. It is further appreciated that the blocks and rails can be made from any suitable materials, including hardened stainless steel, for example. It is further appreciated that the slide assembly may be used without any rail, and that the slide and carriage may be separate structures. In other illustrative embodiments, however, the slide and carriage may be a unitary structure.

A slot 86 is formed in carriage 76 and is configured to receive a portion of band 16. An arm 88 is attached to assembly 46, as well as connects to piston assembly 44 so that, as fluid powers piston assembly 44, any movement that results thereto translates into movement of slide assembly 46. In this illustrative embodiment, at least a portion of arm 88 is disposed within slot 52 of body 42 in order to connect assemblies 44 and 46 together. For example, arm 88 engages grommet 64 of piston assembly 44, and is located adjacent linear seal 66 so that assemblies 44 and 46 can move concurrently without fluid, that is powering piston assembly 44, leaking from chamber 48 to chamber 50.

Saddle assembly 10 is located exterior of body 42, as previously shown in FIG. 1, and comprises saddle 90, guide rollers 92, and scraper 94. In this illustrative embodiment, saddle 90 is attached to carriage 76 via fasteners 96. Saddle 90 is illustratively made from anodized aluminum. Rollers 92 and scraper 94 are positioned below saddle 90. In this illustrative embodiment, magnetic strips 98 border the edges of opening 54 and are configured to magnetically adhere to band 16. Band 16 is illustratively made from UHB 716 stainless steel. The magnetic strips 98 are illustratively made from magnetic particles bound together in a rubberized compound. Band 16 is configured to be disposed in slot 86 of carriage 76 with the raised portions 100 on carriage 76 extending about band 16 and attaching to saddle 90. This attachment allows movement of saddle 90 to be concurrent with slide assembly 46 and piston assembly 44. The rollers 92 are configured to maintain band 16 against magnetic strips 98 when portions of band 16 exit slot 86. This allows the maintenance of a seal between slide chamber 50 and the exterior of body 42. Scraper 94 bounds the lower periphery of saddle 90 to protect the interior of the assembly 40. (See, also, FIGS. 8 and 9.)

Cap blocks 6 and 8 are illustratively made of anodized aluminum. The blocks 6 and 8 are attached to the ends of body 42 via fasteners 102, sealing off the ends of chambers 48 and 50. Blocks 6 and 8 also receive cap seals 104 to prevent fluid power from escaping between the caps 6 and 8 and the ends of the chambers 48. Caps 6 and 8 may further comprise a bore 106 which provides access into the slide chamber 50 to provide shock absorbers at the ends thereof. It is also appreciated that blocks 6 and 8 may also retain band 16 and the ends of linear seal 66. (See, also, FIG. 7.)

Figure 3:
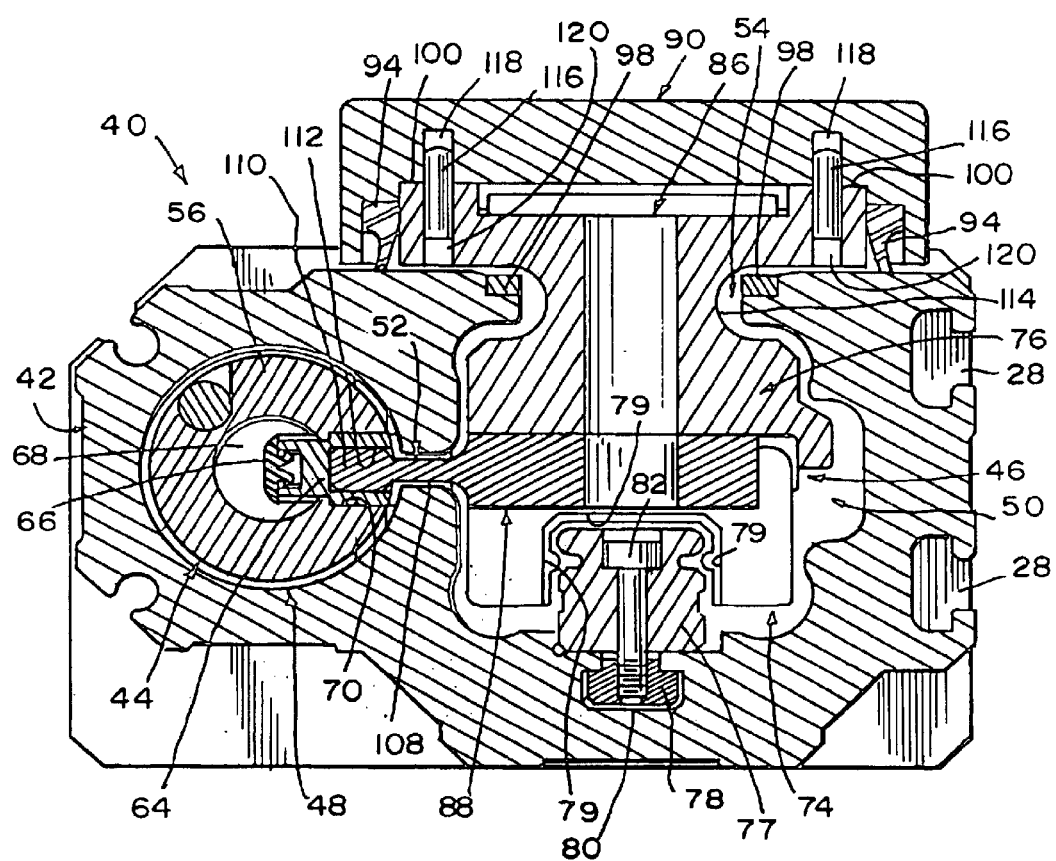
FIG. 3 is a cross-sectional view of an assembled dual chamber rodless slide assembly according to the embodiment of FIG. 2.

A cross-sectional, assembled view of dual chamber rodless slide assembly 40 is shown in FIG. 3. This view shows the illustrative attachment between piston assembly 44 and slide assembly 46. For example, piston 56 is shown located within piston chamber 48. Grommet 64 is coupled to piston 56, illustratively extending into bore 68. Linear seal 66 is shown coupled to grommet 64 within bore 68. Arm 88, illustratively having a narrow stem 108, extends through slot 52 and couples with grommet 64. In this illustrative embodiment, arm 88 comprises a head portion 110 that interference fits with cavity 112 disposed in grommet 64.

Also shown in FIG. 3 is slide assembly 46 disposed in slide chamber 50. In this illustrative embodiment, arm 88 is attached to carriage 76. In addition, slide block 74 is removable with respect to rail 77. It is appreciated herein that slide block rail 77 is a bearing member that engages bearing surface(s) 79 of blocks 74 and 75 to permit movement of same. It is further appreciated the bearing surfaces 79 may comprise a plurality of ball bearings, or a bearing slide, for example, to engage rail 77.

Carriage 76 is shown attached at its lower end to blocks 74 and 75. In this illustrative embodiment, carriage 76 includes a neck 114 that extends upwardly through opening 54 to the exterior of body 42. In this illustrative embodiment, carriage 76 flares outwardly from neck 114 to form the extending portions 100 as shown therein. Also shown is slot 86 formed at the upper periphery of carriage 76 and bounded at its top end by the lower portion of saddle 90. Illustratively, locating guide pins 116 are disposed within openings 118 and 120 of carriage 76 and saddle 90, respectively. This arrangement helps ensure proper alignment between the saddle 90 and the carriage 76. Also shown in this view is scraper 94, which engages the upper surface of assembly 40, again, to prevent excessive contaminants from affecting the operation of the assembly. It is appreciated that scraper 94 can be made from a flexible material, such as polyurethane. Additionally, shown at the periphery of opening 54 are magnetic strips 98 which are configured to engage and hold band 16. (See, also, FIG. 6.) Also shown in this view are attachment channels 28, previously discussed with respect to FIG. 1.

Figure 4:
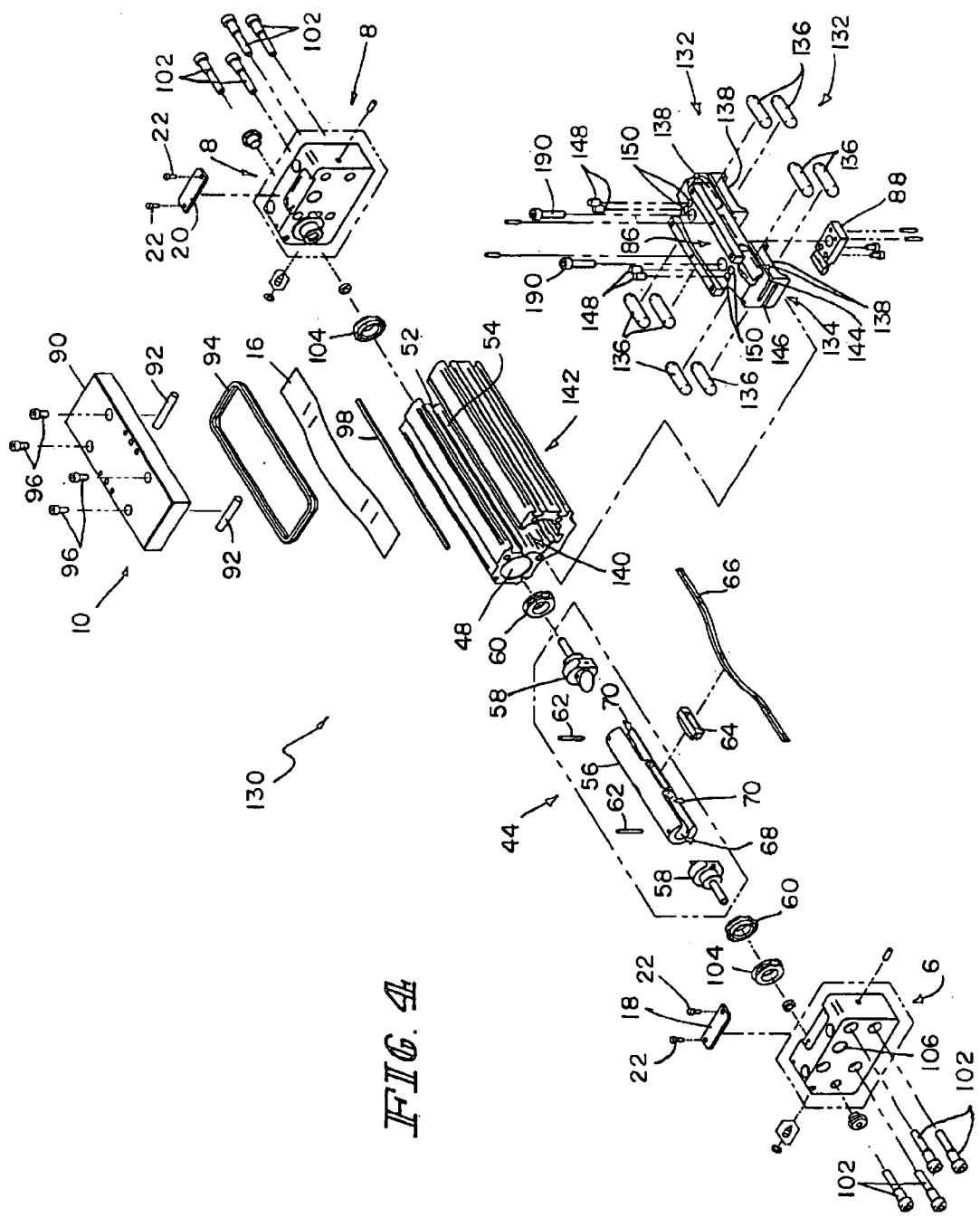
FIG. 4 is an exploded view of another illustrative embodiment of a dual chamber rodless slide assembly.

An exploded view of another illustrative embodiment of a dual chamber rodless slide assembly 130 is shown in FIG. 4. Similar to the rodless slide assembly 40 shown in FIGS. 2 and 3, this rodless slide assembly 130 comprises the aforementioned piston assembly 44 with grommet 64 and linear seal 66. In addition, assembly 130 comprises the aforementioned saddle assembly 10, as well as caps 6 and 8. Still further, assembly 130 comprises the arm 88. (See, also, FIG. 12.) In contrast to rodless slide assembly 40, rodless slide assembly 130 comprises a slide assembly 132. Slide assembly 132 comprises a slide block 134 with bearing members 136 engagable therewith. The bearing members 136 are each engagable within one of an illustrative plurality of cavities 138 located at the periphery of block 134. The bearing members 136 extend from the cavities and are engagable with the inner walls of slide chamber 140 disposed longitudinally through body 142. Similar to the previous embodiment, however, chamber 140 includes opening 54 and slot 52 for the same purposes as previously discussed with respect to assembly 40. Block 134 further illustratively comprises sizing slots 144 and 146. To assist in compensating for tolerances between the cross-sectional size of block 134 with respect to slide chamber 140, it is contemplated that the cross-sectional area of block 134 is expandable or contractible. For example, set screws 148 are disposed through bores 150 to either expand or contract slots 144 or 146 which causes corresponding expansion or contraction of block 134. This adjustability allows proper mating between block 134, bearings 136, and slide chamber 140. (See, also, FIG. 5.)

Similar to assembly 40, block 134 of assembly 130 includes a slot 86 which, too, is configured to receive band 16, such as that described with respect to assembly 40. In addition, saddle assembly 10 includes rollers 92 and scraper 94 to keep the band 16 positioned against the magnetic strips 98, and to wipe contaminants from the area of band 16 as previously discussed.

Figure 5:
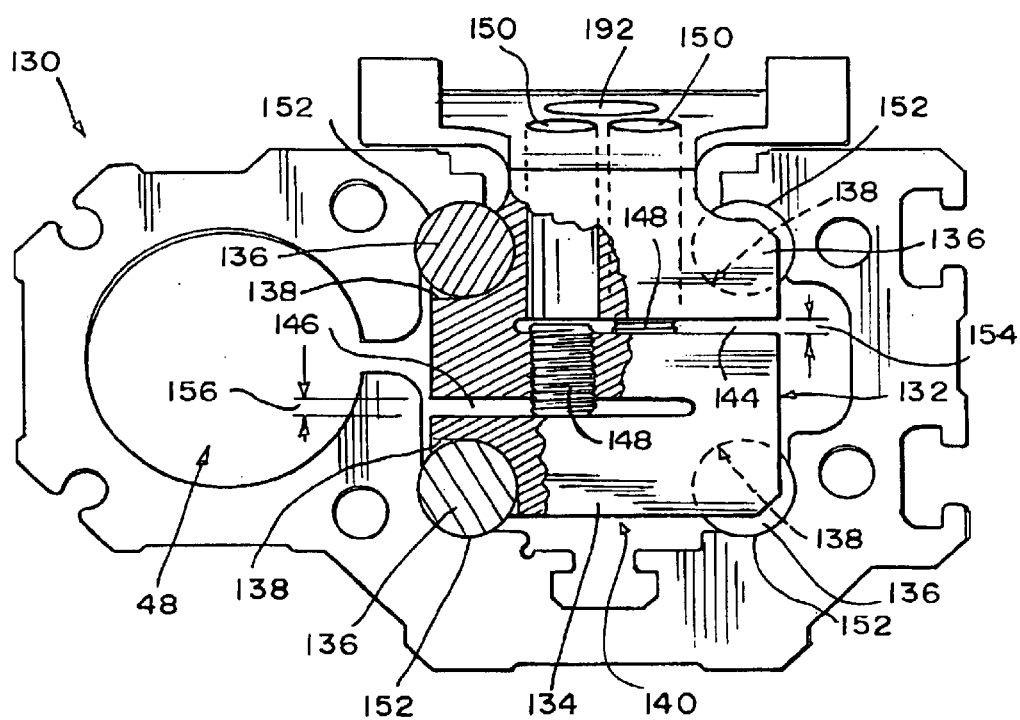
FIG. 5 is a cross-sectional view of an assembled dual chamber rodless slide assembly according to the embodiment of FIG. 4.

A cross-sectional view of the dual chamber rodless slide assembly 130 is shown in FIG. 5. In this illustrative embodiment, piston assembly 44 is attached to slide assembly 132 in similar fashion to that described with respect to rodless slide assembly 40. For purposes of clarity, therefore, those details have not been reproduced in FIG. 5. Rather, slide chamber 140 is shown with slide assembly 132 located therein. In this illustrative embodiment, block 134 is shown riding on bearing members 136. Illustratively, longitudinally extending arcuate channels 152 are formed within the periphery of chamber 140. Longitudinally extending arcuate channels 152 form the surface with which bearing members 136 engage when slide assembly 132 travels within chamber 140. It is appreciated that in one illustrative embodiment, cavities 138 are arcuately formed. This allows a tolerance to exist between slide block 134 and longitudinally extending arcuate channels 152 in chamber 140 to permit proper mating between said chamber 140 and assembly 132. Bearing members 136 are allowed to move within the cavity so as to best position themselves with respect to longitudinally extending arcuate channels 152.

Further assisting in providing the proper tolerance between slide assembly 132 and slide chamber 140 is the ability of sizing slots 144 and 146 to be adjustable, as previously discussed. For example, set screw 148 can be disposed within bore 150 and engage slot 144. Disposing set screw 148 further within slot 144, block 134 will be caused to expand. Conversely, retracting set screw 148 from slot 144 causes block 134 to contract. Similarly, another set screw 148, located within another bore 150, can be disposed into slot 146 such that, as the set screw 148 tightens, it too expands the space 156, thereby expanding the cross-sectional area of block 134. Depending on the adjustments made to set screws 148, the proper tolerances between block 134, bearing members 136, and longitudinally extending arcuate channels 152 of chamber 140 can be optimized to allow proper movement of assembly 132 within chamber 140. Locking bolts 190 are disposed in bores 192 to lock the size of block 134. (See, also, FIG. 11.)

Figure 6:
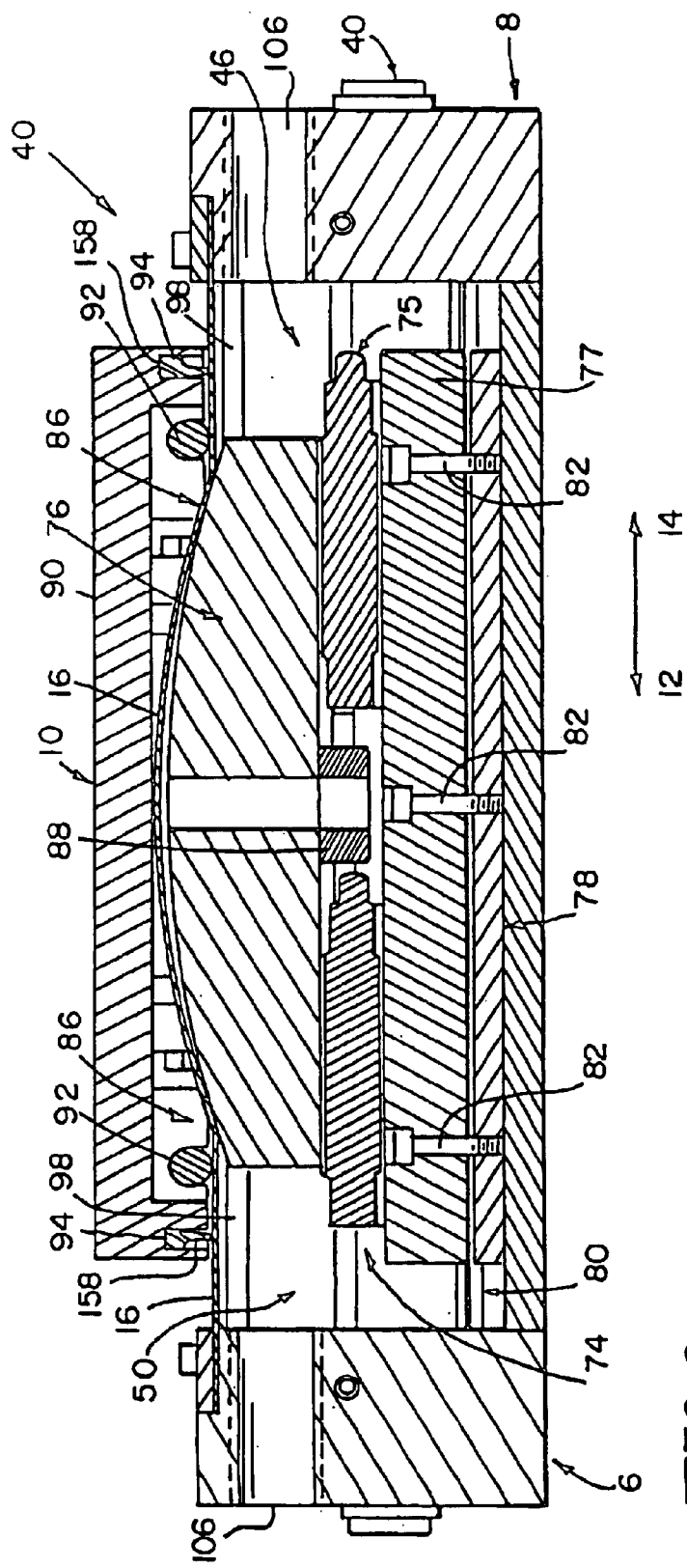
FIG. 6 is a side, cross-sectional view of the embodiment of the dual chamber rodless slide assembly of FIGS. 2 and 3.

A side, cross-sectional view of the dual chamber rodless slide assembly 40 of FIGS. 2 and 3 is shown in FIG. 6. This assembled, cross-sectional view shows the relationship between slide assembly 46 with carriage 76 and saddle assembly 10. In this illustrative embodiment, slide assembly 46 is shown located within slide chamber 50 wherein nut 78 is positioned within rail slot 80. Also shown is nut 78 attached to rail 77 via fasteners 82. Arm 88 is also shown attached to slide carriage 76 between block 74 and 75. Carriage 76 has an arcuate slot 86 at its upper surface. Accordingly, as slide assembly 46 moves within chamber 50 in directions 12 or 14, band 16 is raised, separating the same from magnetic strip 98. This allows slide assembly 46, carriage 76, and saddle assembly 10 to move unimpeded by band 16. Though it is desirable to separate the exterior from slide chamber 50, accomplished by band 16, displacement of a portion of band 16 occurs illustratively at carriage 76 during movement of the same in directions 12 and 14. In order to mitigate the displacement of band 16 from magnetic strips 98, the rollers 92, shown below saddle 90, are placed at the ends of the arcuate portions of carriage 76. Accordingly, as slide assembly 46 and carriage 76 pass, roller 92 applies a force against the separated portion of band 16 to re-couple the same with magnetic strip 98. This allows the displacement of band 16 to only occur at carriage 76. Once that carriage passes, the rollers 92 reunite band 16 with the magnetic strip, thereby maintaining a seal between the exterior and slide chamber 50. Also shown in this view is scraper 94, a portion of which is fitted within a cavity 158 and saddle 90, and depending downwardly to scrape against band 16 and the top surface of body 42. Having scraper 94 border the carriage 76, contaminants are essentially kept from migrating to the area where band 16 is separated from magnetic strip 98.

It is appreciated that in FIGS. 6 through 15, and 18 through 20, the stroke in directions 12 and 14 have been reduced substantially. This limited stroke is for illustrative purposes only, to show the various structures of the disclosure. It is contemplated that the stroke for saddle 90 between end caps 6 and 8 can be any desired distance, and is not limited to that shown in the figures.

Figure 7:
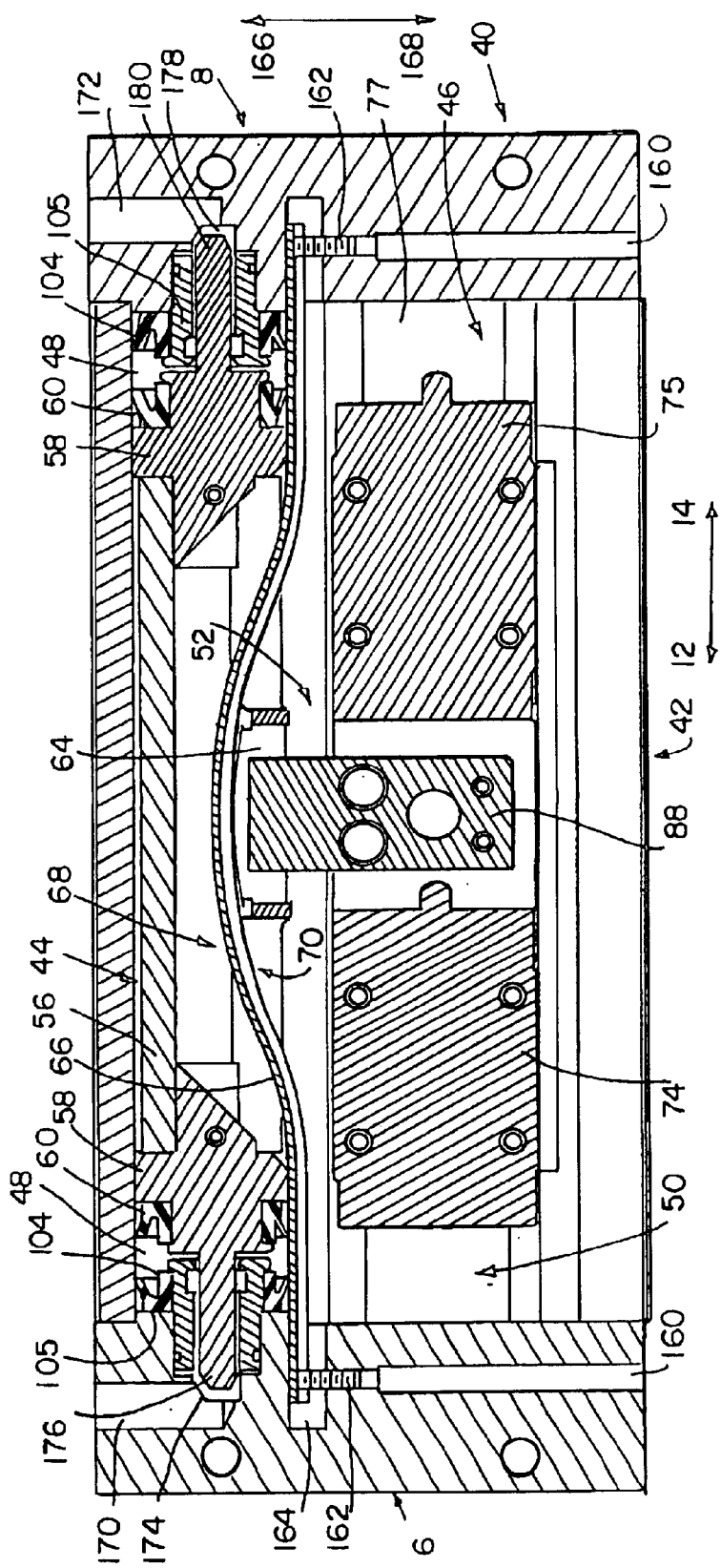
FIG. 7 is a top, cross-sectional view of the interior of the embodiment of the dual chamber rodless slide assembly of FIGS. 2, 3 and 6.

A top, cross-sectional view of the interior of dual chamber rodless slide assembly 40 is shown in FIG. 7. This view shows the relative arrangement of components within the interior of body 42. For example, piston assembly 44 is shown located within piston chamber 48, and slide assembly 46 is shown located within slide chamber 50. Arm 88 is shown located between blocks 74 and 75, extending through slot 52 and attaching to grommet 64 of piston 56. Linear seal 66 is illustratively shown attached at caps 6 and 8. Illustratively, a bore 160 is disposed within each end cap 6 and 8 as shown. A fastener 162 is disposed within each bore 160 and enters into a cavity 164, into which the linear seal 66 extends. The fastener 162 engages linear seal 66 against a surface within cavity 164, wedging the seal 66 therebetween.

Also depicted in FIG. 7 is linear seal 66 segregating piston assembly 44 from slide assembly 46. In this embodiment, a portion of linear seal 66 follows slot 52, providing a barrier between chambers 48 and 50. Another portion of linear seal 66 then enters piston assembly 44 between piston seals 60. A portion of seal 66 enters slot 70 and bore 68 within piston 56. As piston assembly 44 moves in either direction 12 or 14, piston assembly 44 and slide assembly 46 move with respect to linear seal 66. The end points of linear seal 66 remain stationary, and only the length of the seal moves in directions 166 and 168, depending on which particular portion of seal 66 is moving into or out of piston 56, respectively. Despite a sinusoidal-like movement seal 66 makes, it maintains a seal between itself and piston seals 60, thus, maintaining fluid separation between chambers 48 and 50.

Fluid ports 170 and 172, which are in fluid communication with fluid controls 24 and 26, respectively, are shown in FIG. 7. (See, also, FIG. 1.) To move piston assembly 44 in direction 14, fluid is supplied into fluid port 170, which is in communication with bore 174. Illustratively, a stud extending from piston cap 58 is disposed in bore 174. The fluid from port 170 begins acting on the stud 176, piston cap 58, and seal 60, causing the fluid to enter and fill chamber 48 between piston and cap seals 60 and 104. The force of the increasing amounts of fluid entering chamber 48 causes the space within the chamber to expand, which causes piston assembly 44 to move, in this case, in direction 14. Consequently, as piston assembly 44 moves, it being attached to slide assembly 46 via arm 88, slide assembly 46 is caused to move concurrently. The movement of slide assembly 46 causes carriage 76 and saddle assembly 10 exterior of body 42, as shown in FIG. 6, to move concurrently as well.

Conversely, to move piston assembly 44 in direction 12, fluid is supplied into fluid port 172 which deposits the same in bore 178. Stud 180, extending from piston cap 58, begins to move in response to the force created by the increasing amounts of fluid entering thereto. In this case, the fluid entering chamber 48 between seals 60 and 104, too, requires additional space and, therefore, forces piston assembly 44 in direction 12. As also previously discussed, the slide assembly being attached to piston assembly 44 via arm 88, as well as carriage 76 and saddle assembly 10 being attached to slide assembly 46, will all move concurrently with the movement of piston assembly 44 in direction 12. Seals 105 are illustratively located about the periphery of studs 176 and 180.

Figure 8:
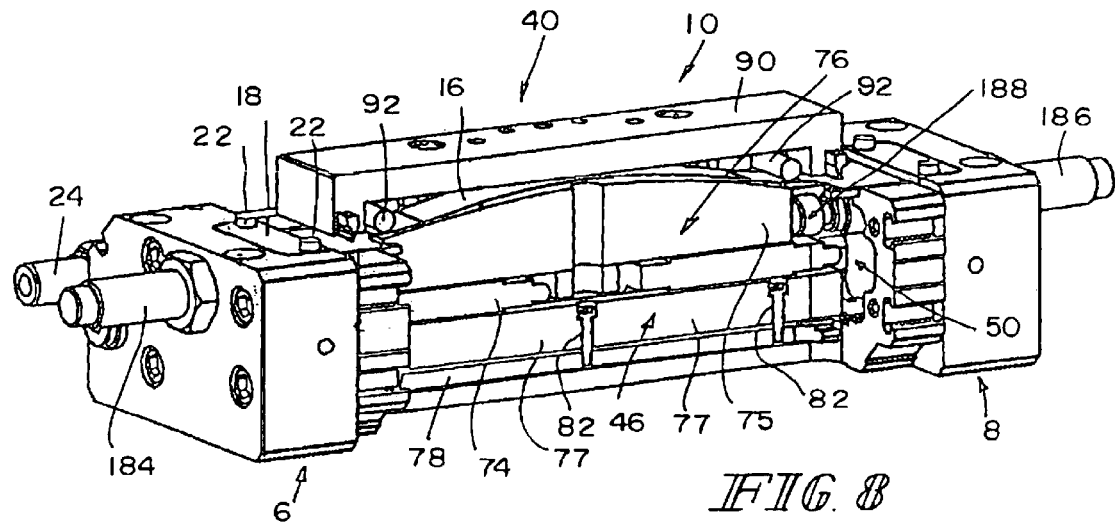
FIG. 8 is a perspective, partially cut-away view of the embodiment of the dual chamber rodless slide of FIGS. 2, 3, 6 and 7.
Figure 9:
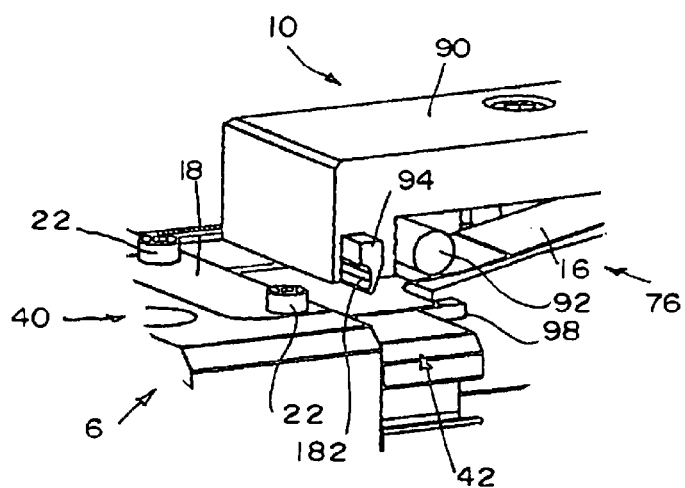
FIG. 9 is a perspective, detail view of the dual chamber rodless slide assembly of FIG. 8.

Perspective, partially cut-away views of dual chamber rodless slide assembly 40 are shown in FIGS. 8 and 9. These views, again, show the structural relationship of slide assembly 46 with carriage 76 and saddle assembly 10. Also shown in FIGS. 8 and 9 is the interaction between roller 92 and band 16. As the detail view of FIG. 9 shows, roller 92, being located near the periphery of saddle 90, is configured to create a downward force onto band 16 so that as saddle assembly 10 finishes passing over a particular location on band 16, roller 92 will assist in replacing band 16 against magnetic strip 98. Again, this occurs because, as saddle assembly 10 passes a particular location on band 16, carriage 76 separates band 16 from magnetic strip 98. This separation allows the connection between the internal carriage 76 and the external saddle 90. Once these structures have passed, however, roller 92 rejoins band 16 to magnetic strip 98. Also shown in FIG. 9 is scraper 94, which illustratively includes a blade 182 to scrape the surface of the body 42 and band 16. Also shown in FIG. 8 are shock absorbing members 184 and 186. Each of the shock absorbers 184 and 186 comprise a head, such as head 188 shown attached to shock absorber 186. Illustratively, the shock absorbers are disposed through bore 106 of either cap 6 or 8, and extend inwardly into chamber 50. (See, also, FIG. 6.) In this illustrative embodiment, head 188 engages carriage 76 to reduce impact forces against the same that might result at the end of a stroke.

Figure 10:
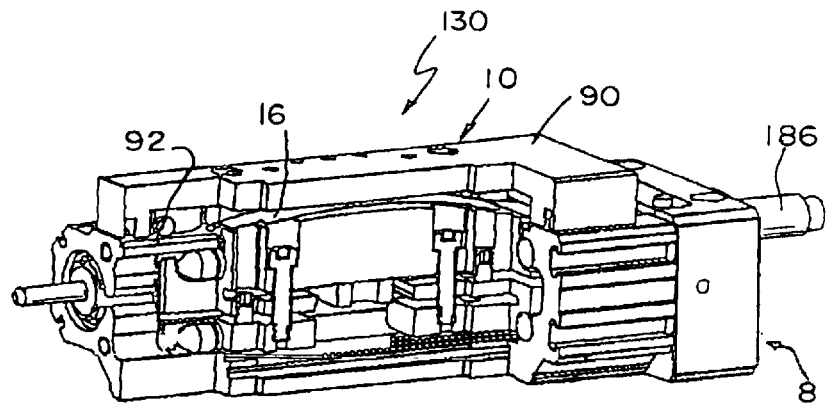
FIG. 10 is a perspective, partially cut-away view of the embodiment of the dual chamber rodless slide assembly of FIGS. 4 and 5.
Figure 11:
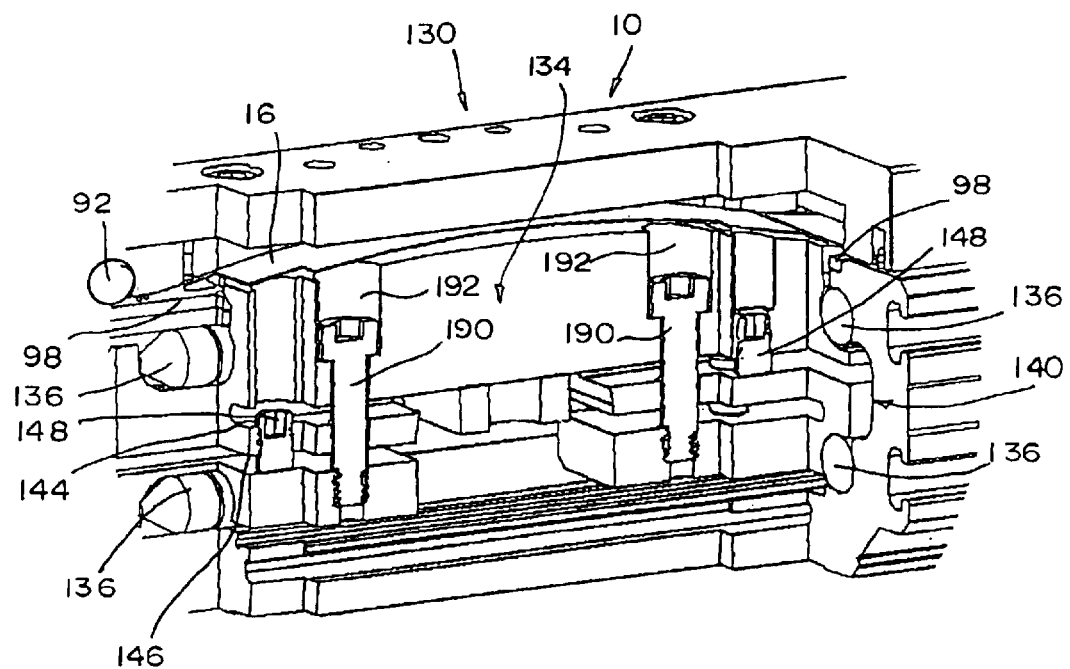
FIG. 11 is a detail view of the dual chamber rodless slide assembly of FIG. 10.

A perspective, partially cut-away view of dual chamber rodless slide assembly 130 is shown in FIGS. 10 and 11. These views better show the relationship between set screws 148 and locking bolts 190. In this illustrative embodiment, when the dimensions of slide block 134 are set by either contracting or expanding slots 144 and 146, a locking bolt 190 is disposed through bore 192 in order to maintain a fixed size. In this illustrative embodiment, bolt 190 extends from the top to the bottom, crossing both slots 144 and 146. Tightening bolts 190 assist in keeping the set screws 148 in their fixed position. The similarity of assembly 40 and assembly 130, with respect to band 16 separating from magnetic strip 98, is also shown in FIG. 11. It is appreciated that the saddle assembly 10 can be used on both slide assembly embodiments 40 and 130.

Figure 12:
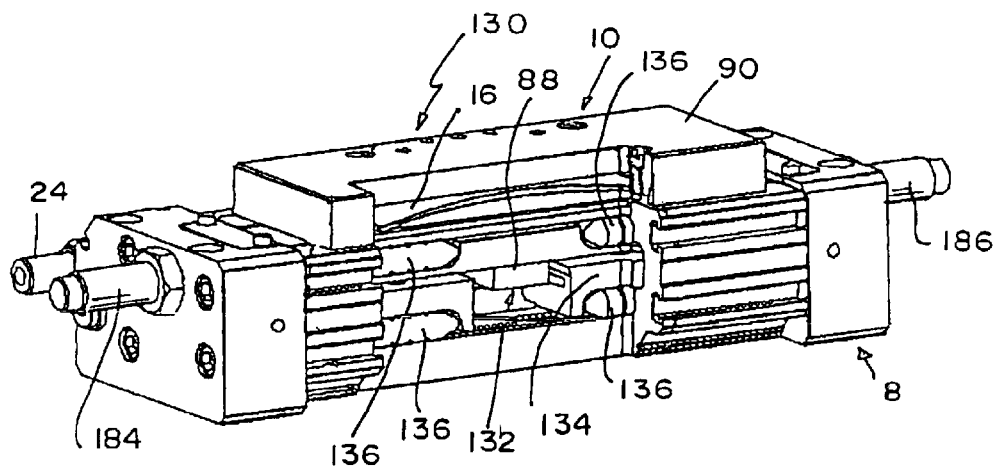
FIG. 12 is another perspective, partially cut-away view of the embodiment of the dual chamber rodless slide assembly of FIGS. 4, 5, 10 and 11.
Figure 13:
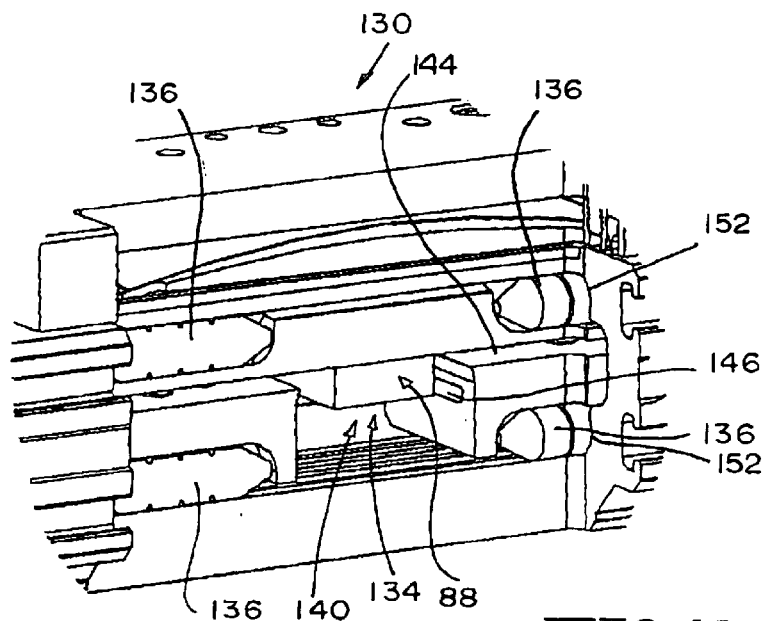
FIG. 13 is a detail view of the dual chamber rodless slide assembly of FIG. 12.

Perspective, partially cut-away views of dual chamber rodless slide assembly 130 are also shown in FIGS. 12 and 13. These views show the relative positioning of bearing members 136 with respect to slide block 134, as well as the longitudinally extending arcuate channels 152 disposed within slide chamber 140. Also shown in FIG. 12 are shock absorbing members 184 and 186. These shock absorbers are similar to those described with respect to dual chamber rodless slide assembly 40 shown in FIG. 8.

Figure 14:
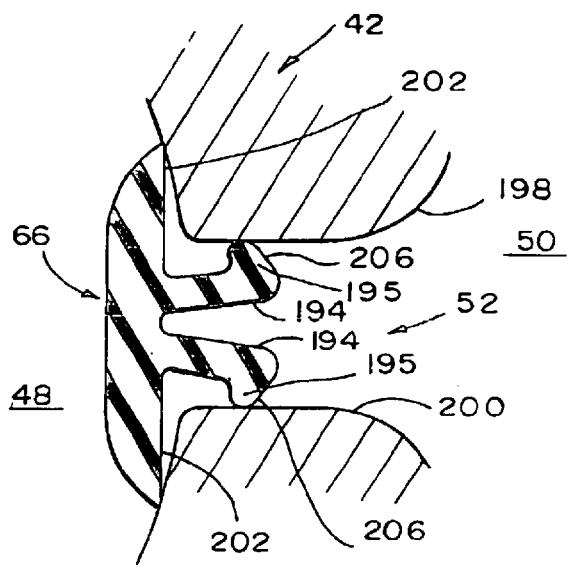
FIG. 14 is a cross-sectional, detail view of a slot and a linear seal portion of a dual chamber rodless slide assembly.
Figure 15:
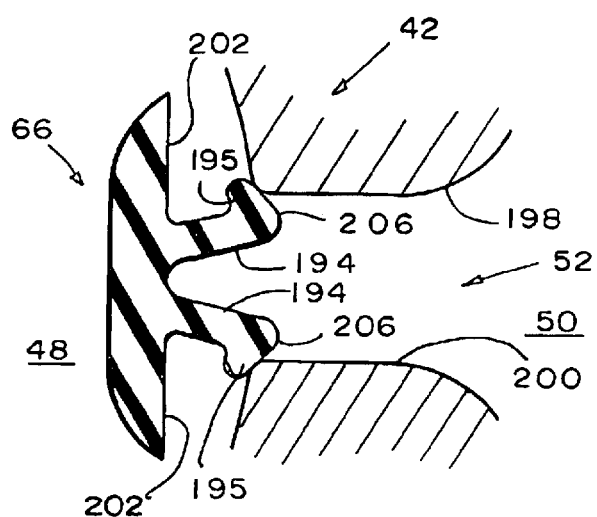
FIG. 15 is another cross-sectional, detail view of the slot and linear seal of FIG. 14.

A detail, sectional view of a portion of dual chamber rodless slide assembly 40 and 130 is shown in FIGS. 14 and 15. This portion comprises slot 52, located between chambers 48 and 50, as well as linear seal 66 separating the two chambers. In this embodiment, when piston 56 is not engaging seal 66, the same is positioned like that shown in FIG. 14 for maintaining a seal between chambers 48 and 50. In this embodiment, retention legs 194 are biased away from each other so that their feet 195 engage the side walls 198 and 200. These feet 195 wedge against walls 198 and 200 of slot 52 in conjunction with surfaces 202, maintaining a fluid separation between chambers 48 and 50. During instances when linear seal 66 is drawn into piston 56, portions of the linear seal 66 adjacent the grommet 64 may be partially separated from slot 52. As shown in FIG. 15, when linear seal 66 is drawn away from slot 52 and into chamber 48 and bore 68, the bias of legs 194 causes the feet 195 to expand, yet, continue to engage walls 198 and 200, despite the separation of surfaces 202. Illustratively, the feet 195 of linear seal 66 include angled surfaces with respect to walls 198 and 200. These angled surfaces 206 allow legs 194 to be drawn inwardly against their bias when seal 66 reengages with slot 52.

Figure 16:
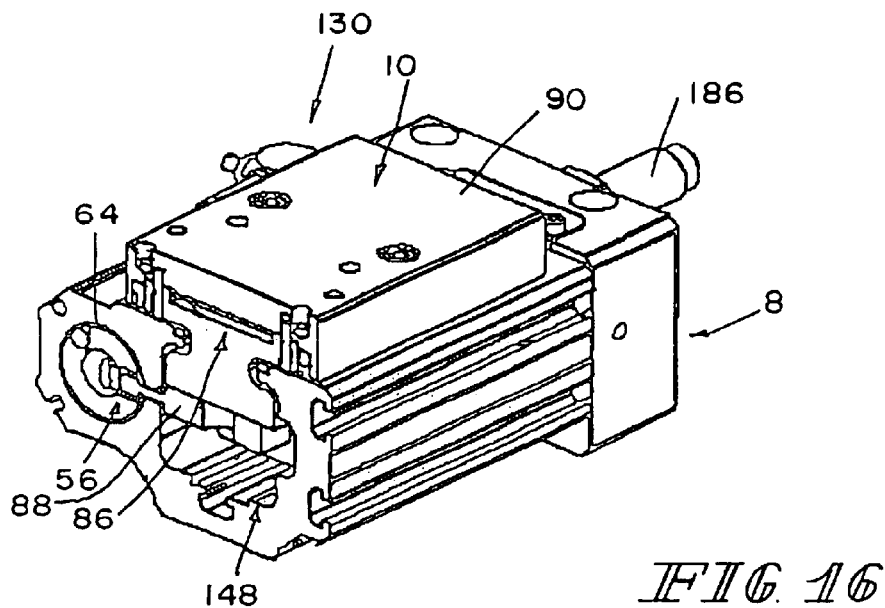
FIG. 16 is a cross-sectional, perspective view of a portion of a dual chamber rodless slide assembly.
Figure 17:
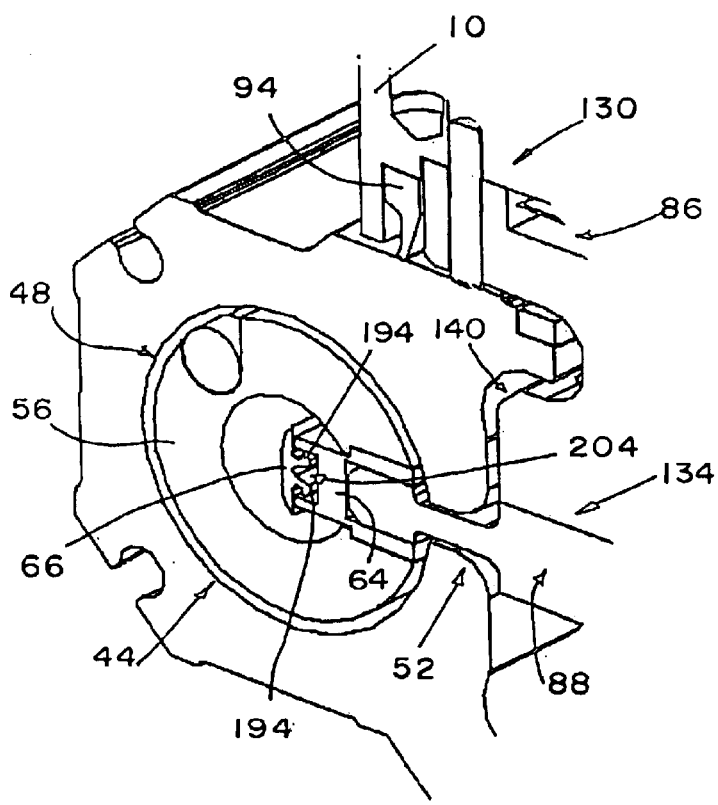
FIG. 17 is a cross-sectional, perspective detail view of the dual chamber rodless slide assembly of FIG. 16.

Perspective, cut-away and detail views of dual chamber rodless slide assembly 130 are shown in FIGS. 16 and 17. These views show the relationship between linear seal 66 and grommet 64, similar to that shown in FIG. 3. It is appreciated that, although assembly 130 is shown, the particular disclosures with respect to piston assembly 44, seal 66, and arm 88 are the same for the embodiment of dual chamber rodless slide assembly 40 as well. The legs 194 of linear seal 66 are guided by grommet 64.

Figure 18:
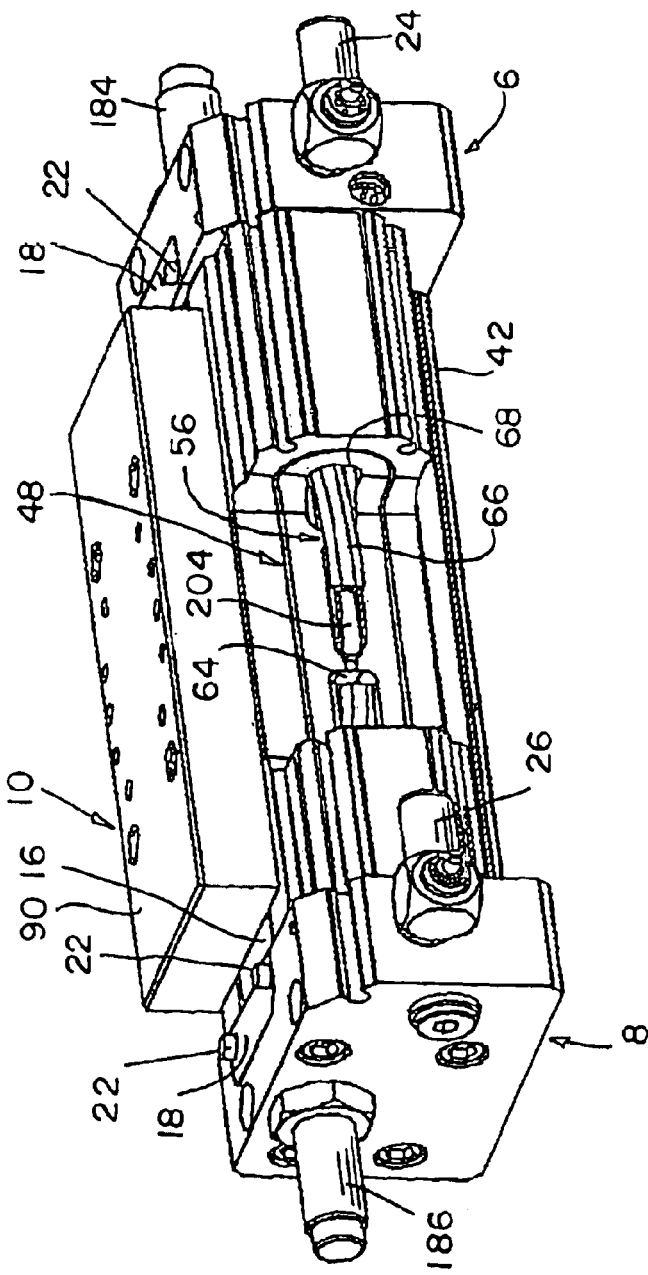
FIG. 18 is a perspective, partially cut-away view of a dual chamber rodless slide assembly.
Figure 19:
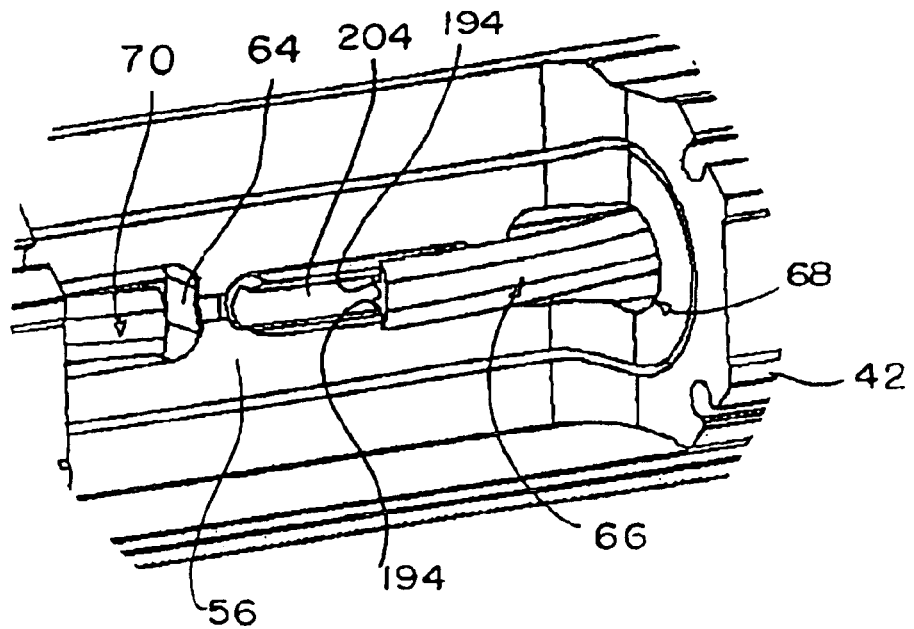
FIG. 19 is a perspective, detail view of the cut-away portion of the dual chamber rodless slide assembly of FIG. 18.
Figure 20:
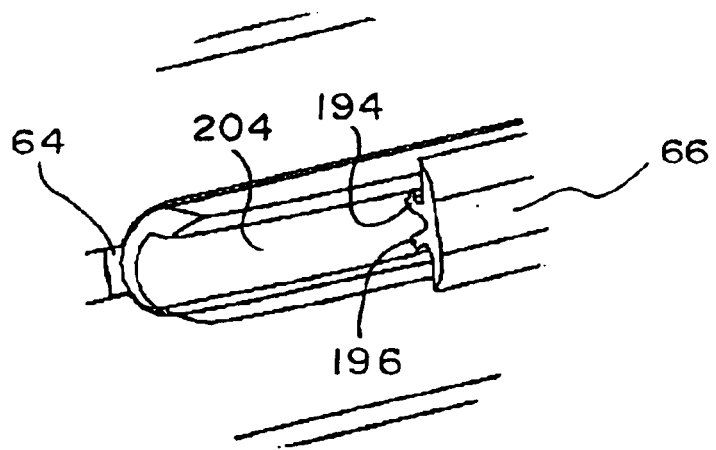
FIG. 20 is another perspective, detail view of the cut-away portion of the dual chamber rodless slide assembly of FIGS. 19 and 18.

Partially cut-away, perspective views of dual chamber rodless slide assembly 40 are shown in FIGS. 18 through 20. The views are partially cut-away to show the details within piston chamber 48 and piston 56. As shown in FIG. 18, for example, a portion of piston 56 has been removed to expose bore 68, revealing how linear seal 66 is disposed therethrough and engages channel portion 204 of grommet 64. A more detailed view of the cut-away portion of assembly 40 is shown in FIG. 19. In this view, as with all the views of FIGS. 18 through 20, a portion of linear seal 66 is cut away so that the cross-section of the seal can be shown where the legs 194 of seal 66 engage channel portion 204. Additionally, this view depicts how linear seal 66 is threaded through slots 70 and into and out of bore 68 of piston 56. As piston 56 moves along the length of chamber 48, linear seal 66 is being constantly threaded into and out of piston 56 to allow travel of the piston without breaking the seal between chambers 48 and 50. A yet closer detail view of the channel portion 204 of grommet 64 and the legs 194 of linear seal 66 are shown in FIG. 20.

Figure 21:
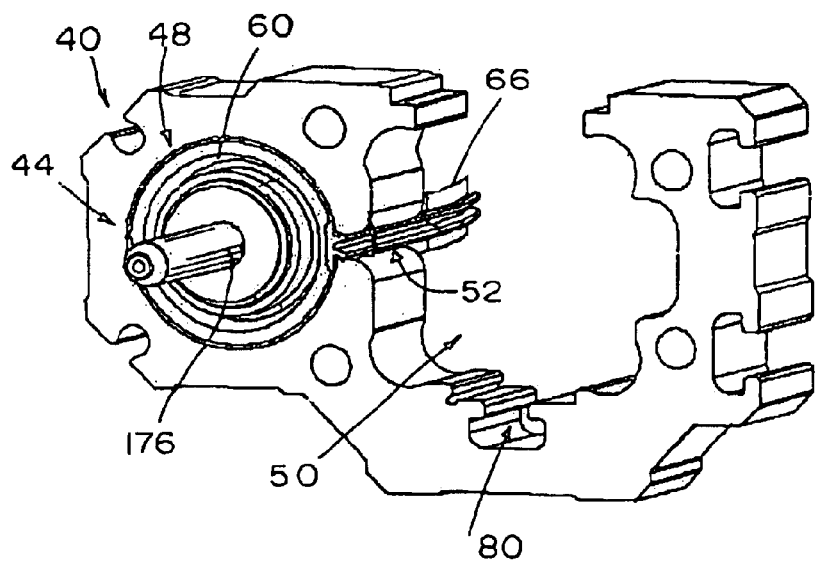
FIG. 21 is a perspective, isolated view of a portion of a dual chamber rodless slide assembly.
Figure 22:
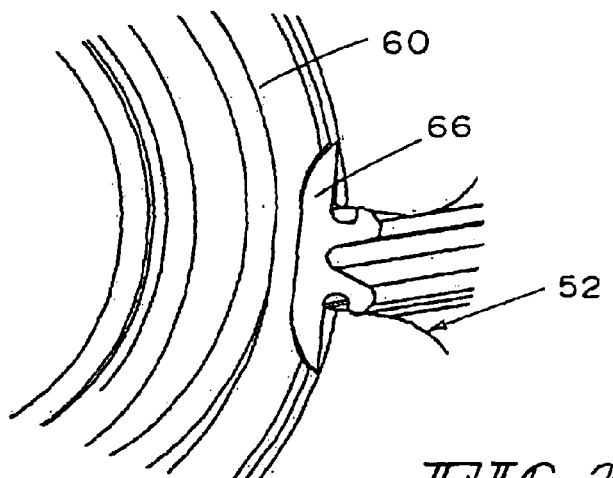
FIG. 22 is a detail view of the portion of the dual chamber rodless slide assembly of FIG. 21.
Figure 23:
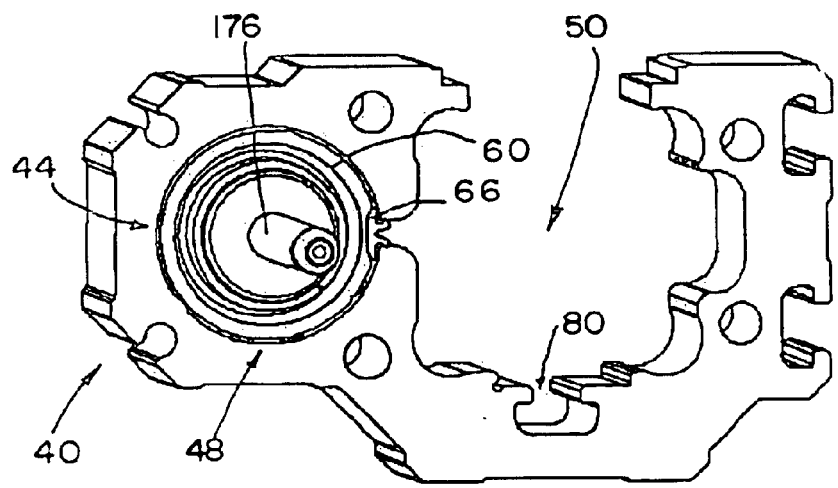
FIG. 23 is another isolated perspective view of a portion of a dual chamber rodless slide assembly.
Figure 24:
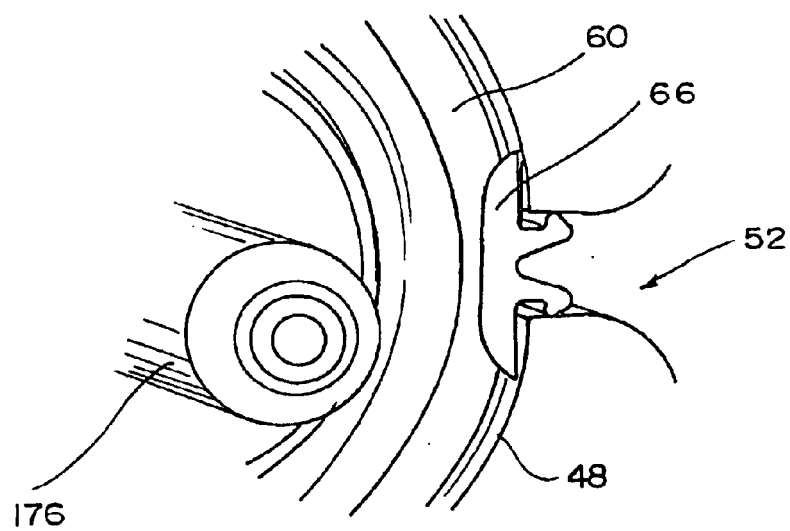
FIG. 24 is a detail view of a portion of the dual chamber rodless slide assembly of FIG. 23.

Several views illustrating how linear seal 66 maintains its sealing effect at the peripheries of piston assembly 44 are shown in FIGS. 21 through 24. For example, FIG. 21 is a right-hand perspective, cut-away view of a portion of dual chamber rodless slide assembly 40, showing the end of piston assembly 44 as well as a portion of linear seal 66. The piston assembly 44 is located within chamber 48, whereas a portion of seal 66 is located in slot 52. In one embodiment, a piston seal 60 is located at the periphery of piston assembly 44 within piston chamber 48. (See, also, FIG. 2.) Because such a seal is located at both peripheries of the piston assembly 44, fluid that enters the chamber 48 must do so and remain on either side of piston assembly 44. This is why fluid pressure filling on one side of piston assembly 44 creates enough force to expand the volume within the chamber by moving the piston assembly 44. Seal 60 prevents any of that fluid from leaking into the piston assembly 44 itself. Because slot 52 exists between chambers 48 and 50, in order to accommodate arm 88 (see, also, FIG. 3), a seal is maintained exterior of piston assembly 44 to prevent any such leaking from occurring. As shown in FIG. 22, piston seal 60 is biased against linear seal 66, keeping the same against slot 52. Accordingly, as piston assembly 44 travels, piston 56, with its grommet 64 engaging seal 66, pulls seal 66 from slot 52, during the concurrent movement of the connected piston and slide assemblies 44 and 46, respectively. (See, also, FIGS. 19 and 20.) After a portion of seal 66 has been pulled away from slot 52 and piston 56 has passed the bias of piston seal 60, forces seal 66 back into slot 52, at least to the extent of creating a seal between the two chambers. The effect is a continuous sinusoidal motion of linear seal 66 being drawn into and out of slot 52 as piston 56 passes while maintaining a seal between chambers 48 and 50. A left-hand, cut-away view of assembly 44 shown in FIG. 23 shows piston seal 60, again, biased against linear seal 66 to ensure a seal between linear seal 66 and slot 52 as piston 56 passes. A left-hand, detail view of piston seal 60 and linear seal 66 of FIG. 23 are shown in FIG. 24, again, depicting the maintenance of a seal between piston seal 60 and linear seal 66.

Figure 25:
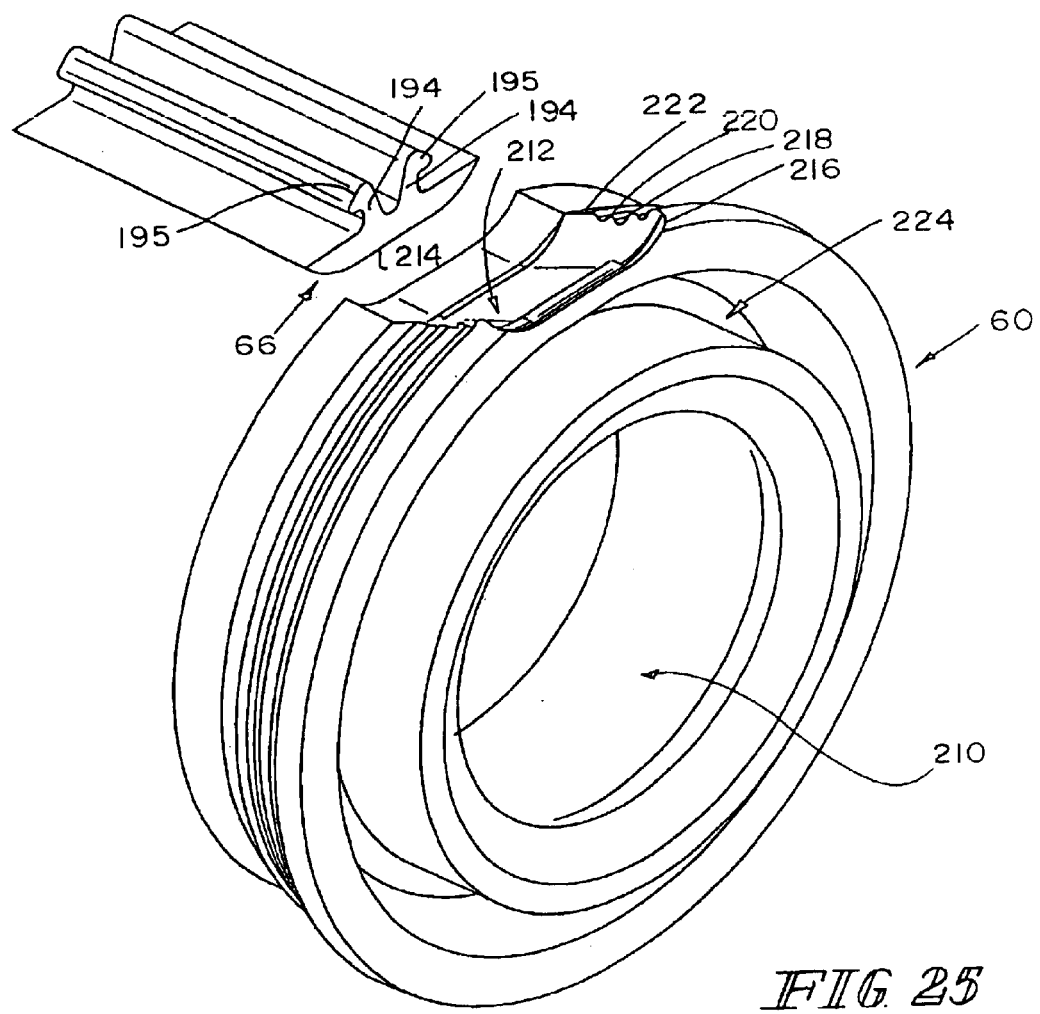
FIG. 25 is an exploded perspective view of a piston seal and linear seal portions of the dual chamber rodless slide assembly.

A detailed exploded perspective view of piston seal 60 and a portion of linear seal 66 is shown in FIG. 25. A bore 210 is disposed through piston seal 60 to illustratively accommodate piston caps 58. (See FIG. 7.) About the outer periphery of piston seal 60 is a cavity 212 that is illustratively the shape of the head portion 214 of linear seal 66. In the illustrative embodiment, head portion 214 fits within cavity 212 for providing a seal therebetween. The linear seal 66 is illustratively made from accurately extruded nylon to provide the complimentary shape with cavity 212 to form an air tight seal therebetween. In addition, piston seal 60 comprises ridges 216, 218, 220, and 222 formed at the outer periphery. The edges are illustratively rounded to maintain any lubricant, such as grease, on the walls of chamber 48. Furthermore, this illustrative embodiment uses the plurality of such ridges located in series to carry additional grease along the inner surface of piston chamber 48 as needed. It is appreciated that any number of such ridges, such as those illustratively shown in FIG. 25, can be used, including even a single ridge.

Figure 26:
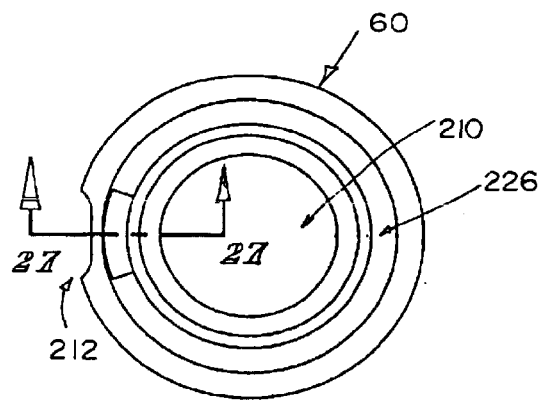
FIG. 26 is a top view of one illustrative embodiment of a piston seal.
Figure 28:
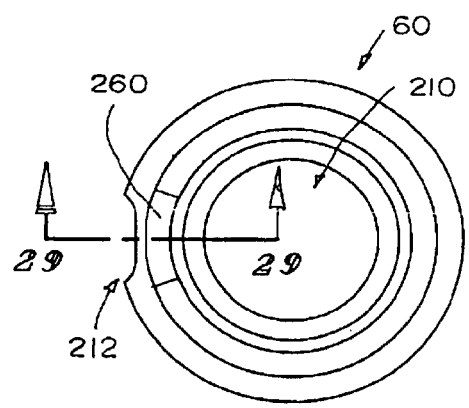
FIG. 28 is a top view of another illustrative embodiment of a piston seal.
Figure 27:
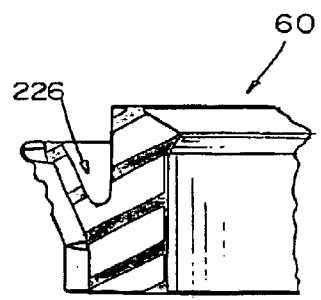
FIG. 27 is a side, cross-sectional view of the piston seal shown in FIG. 26 along lines 27.
Figure 29:
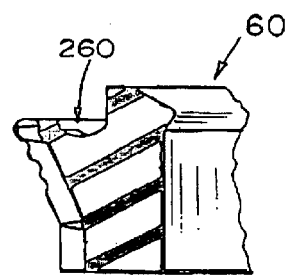
FIG. 29 is a side, cross-sectional view of the piston seal of FIG. 28 shown along lines 29.

A channel 224 is formed in piston seal 60 to provide an outward bias to the seal 60 against the walls of chamber 48. This is accomplished by fluid entering the channel 224 which attempts to expand the walls of the channel. This puts expansive pressure on the periphery of the seal. The channel sizes formed within piston seal 60 can vary, however. For example, in FIGS. 26 and 27, piston seal 60 has a deep channel 226. As specifically shown in FIG. 27, which is a cross-sectional view taken along lines 27 of FIG. 26, the channel can be relatively deep. In contrast, and as shown in FIGS. 28 and 29, reinforcing portion 260 used to reinforce cavity 212 can make the channel shallow.

A top, cross-sectional view of a portion of dual chamber rodless slide assembly 40 is shown in FIG. 30. This illustrative embodiment is similar to that shown in FIG. 7, with the exception of stud 302 having a stud bore 304 extending therein and a vent bore 306. Stud bore 304 is in communication with port 170 and with vent bore 306. Vent bore 306 is also in communication with chamber 48 between seals 60 and 104. In this illustrative embodiment, as piston assembly 44 travels in direction 12, fluid remaining in chamber 48 between seals 60 and 104 is exhausted through bore 304 and 306 and out through port 170. As stud 302 engages snout 308 in cap 6, seal 105, in conjunction therewith, prevents fluid in chamber 48 from exhausting through port 170. The fluid assists in providing a resistance to the travel in direction 12, thereby dampening the kinetic energy. For example, volume within chamber 48 can be determined by the bore area of the chamber 48 minus the area and length of stud 302. A resisting force for stopping a load can be estimated by multiplying the increased pressure, by the effective bore area of chamber 48, and then comparing that resisting force to the kinetic energy applied by the mass and velocity of the load.

In order to prevent an excess build up of pressure within the portion of chamber 48 shown in FIG. 30, the vent bore 306, being in communication therewith, allows fluid to enter and travel through stud bore 304 and out port 170. This controlled leak allows a measured reduction of the resistance force as the piston assembly 44 completes its stroke. It is appreciated that stud 302 may also comprise a cushion needle (not shown) to provide a secondary bleed-off orifice. It is contemplated that this needle can be adjustable. This would allow flexibility in the amount of bleed-off that occurs from the orifice, which, in turn, controls the amount of resistance force acting on piston assembly 44. It is appreciated that associated structures are present at the opposite end of chamber 48 so that fluid is exhausted through port 172 in the same manner as described with regard to port 170 when piston assembly 44 travels in direction 14.

The illustrative embodiment shown in FIG. 30 also discloses a guide angle 310 disposed on piston cap 58 which is shown illustratively opposite stud 302. The guide angle 310 assists linear seal 66 in following the path into and out of bore 68 of piston 56. In addition, piston cap 58 comprises a guide radius 312 configured to assist locating linear seal 66 into slot 52 as piston assembly 44 travels the length of chamber 48.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A rodless slide assembly comprising:
    a first longitudinally extending chamber;
    a second longitudinally extending chamber located adjacent the first longitudinally extending chamber and in communication therewith;
    a piston assembly disposed in the first longitudinally extending chamber and movable relative thereto; and
    a slide assembly disposed in the second longitudinally extending chamber and movable relative thereto;
    wherein the piston assembly is coupled to the slide assembly.

2. The rodless slide assembly of claim 1, further comprising a longitudinally extending slot located between the first and second longitudinally extending chambers, wherein the slot provides communication between the chambers.

3. The rodless slide assembly of claim 1, wherein a linear seal is positioned between the first and second longitudinally extending chambers.

4. The rodless slide assembly of claim 3, wherein a piston seal is located in the first longitudinally extending chamber.

5. The rodless slide assembly of claim 4, wherein the piston seal has a cavity that is complimentarily shaped and engages a portion of the linear seal.

6. The rodless slide assembly of claim 1, wherein the first longitudinally extending chamber receives first and second piston seals with the piston assembly located therebetween.

7. The rodless slide assembly of claim 1, wherein the second longitudinally extending chamber further comprises a longitudinally extending channel disposed therein.

8. The rodless slide assembly of claim 7, wherein the slide assembly further comprises a bearing member extending therefrom, the bearing member being located in the longitudinally extending channel and configured for movement therein.

9. The rodless slide assembly of claim 8, wherein the bearing member is a bearing rail.

10. The rodless slide assembly of claim 1, wherein a grommet is attachable to the piston assembly and couples to the slide assembly so that actuation of the piston assembly causes the slide assembly to move.

11. The rodless slide assembly of claim 1, wherein a longitudinally extending opening is disposed through the second longitudinally extending chamber.

12. The rodless slide assembly of claim 11, further comprising a longitudinally extending cover positioned over the opening.

13. The rodless slide assembly of claim 12, wherein a portion of the slide assembly extends from the opening, receiving a portion of the cover and attaching to an outer saddle.

14. The rodless slide assembly of claim 1, wherein the slide assembly comprises a bearing member extending therefrom and engaging an inner surface of the second longitudinally extending chamber.

15. The rodless slide assembly of claim 1, wherein the slide assembly comprises a plurality of bearings, each configured to engage an inner surface of the second longitudinally extending chamber.

16. The rodless slide assembly of claim 1, wherein the slide assembly comprises a body that is selectively expandable and contractible to adjust tolerance between a plurality of bearings and an inner surface of the second longitudinally extending chamber.

17. The rodless slide assembly of claim 16, wherein adjustment of the slide assembly is accomplished by at least one slot and at least one fastener wherein the fastener can either expand or contract the slot to either selectively expand or contract the slide assembly.

18. A rodless slide assembly comprising:
    a piston assembly;
    a longitudinally extending chamber;
    a slide assembly located and moveable within the longitudinally extending chamber;
    wherein the piston assembly is in communication with the slide assembly; and
    wherein the piston assembly is located exterior of the longitudinally extending chamber.

19. The rodless slide assembly of claim 18, wherein the piston assembly is located in another longitudinally extending chamber.

20. The rodless slide assembly of claim 18, wherein the slide assembly is connected to a saddle located exterior of the longitudinally extending chamber.

21. The rodless slide assembly of claim 18, wherein the piston assembly is spaced apart from the slide assembly, wherein the slide assembly is movable in a plane that is located substantially parallel to the piston assembly.

22. The rodless slide assembly of claim 21, wherein the slide assembly is connected to a saddle located exterior of the longitudinally extending chamber.

23. The rodless slide assembly of claim 18, wherein the longitudinally extending chamber is located in a housing and is positioned substantially parallel to another longitudinally extending chamber that receives the piston assembly.

24. The rodless slide assembly of claim 23, wherein the housing has a slot located therein which provides communication between the piston and slide assemblies.

25. A rodless slide assembly comprising a piston and a slide, both located within a housing, wherein the piston is actuated for reciprocal movement and the slide is attached to the piston for concurrent movement and in concurrent direction therewith, and wherein the slide and piston are located in separate chambers.

26. The rodless slide assembly of claim 25, wherein the chambers are located substantially parallel to each other.

27. The rodless slide assembly of claim 25, further comprising a saddle attached to the slide and located exterior of the housing.

28. A rodless slide assembly comprising: a first longitudinally extending chamber, a second longitudinally extending chamber located adjacent the first longitudinally extending chamber and having a slot located therebetween; a piston assembly located in the first longitudinally extending chamber and moveable relative thereto; a slide assembly located in the second longitudinally extending chamber and moveable relative thereto; an arm located in the slot and attached to the piston assembly and to the slide assembly; wherein the second longitudinally extending chamber having a longitudinally extending opening; a carriage extending from the longitudinally extending opening; and a saddle attached to the carriage and located exterior of the second longitudinally extending chamber.

29. A rodless slide assembly comprising first and second longitudinally extending chambers wherein the first chamber comprises a powered actuation means, and the second chamber comprises a slide means wherein the slide means engages the actuation means, as well as an attachment means located exterior of the rodless slide assembly and wherein the actuation means and the slide means move in concurrent directions.

* * * * *